United States Patent
Wiedenhoefer

(10) Patent No.: US 12,209,819 B2
(45) Date of Patent: Jan. 28, 2025

(54) CONFORMAL HEAT EXCHANGER

(71) Applicant: RTX Corporation, Farmington, CT (US)

(72) Inventor: James Fredric Wiedenhoefer, Windsor, CT (US)

(73) Assignee: RTX CORPORATION, Farmington, CT (US)

( * ) Notice: Subject to any disclaimer, the term of this patent is extended or adjusted under 35 U.S.C. 154(b) by 104 days.

(21) Appl. No.: 17/831,759

(22) Filed: Jun. 3, 2022

(65) Prior Publication Data

US 2023/0392880 A1 Dec. 7, 2023

(51) Int. Cl.
- *F28F 3/02* (2006.01)
- *B23K 1/00* (2006.01)
- *F28D 1/03* (2006.01)
- *F28D 21/00* (2006.01)

(52) U.S. Cl.
CPC ............ *F28F 3/025* (2013.01); *B23K 1/0012* (2013.01); *F28D 1/0358* (2013.01); *F28D 21/00* (2013.01); *F28D 2021/0026* (2013.01)

(58) Field of Classification Search
CPC ........... F28D 2021/0021; F28D 1/0358; F28D 1/0366; Y02T 50/60; F05D 2260/213; F05D 2260/22141; F05D 2260/606; F28F 2215/08; F28F 3/025; F28F 3/027
See application file for complete search history.

(56) References Cited

U.S. PATENT DOCUMENTS

| | | | | |
|---|---|---|---|---|
| 2,571,631 A | * | 10/1951 | Trumpler | F28F 3/027 165/DIG. 373 |
| 2,656,158 A | * | 10/1953 | Hodson | F28D 9/0018 165/DIG. 393 |
| 3,166,122 A | * | 1/1965 | Hryniszak | F28D 9/00 165/166 |
| 3,734,135 A | * | 5/1973 | Mosier | F28F 13/12 165/149 |
| 4,505,419 A | | 3/1985 | Steeb | |
| 4,899,808 A | * | 2/1990 | Gregory | F28F 17/005 165/110 |
| 5,564,496 A | * | 10/1996 | Blum | F28F 19/06 428/653 |

(Continued)

FOREIGN PATENT DOCUMENTS

| | | | |
|---|---|---|---|
| CN | 107509366 A | * 12/2017 | |
| EP | 3176530 A1 | * 6/2017 | F02C 7/18 |

(Continued)

OTHER PUBLICATIONS

Search Report issued in European Patent Application No. 23177299.7; Application Filing Date Jun. 5, 2023; Date of Mailing Oct. 6, 2023 (6 pages).

*Primary Examiner* — Jenna M Maroney
(74) *Attorney, Agent, or Firm* — CANTOR COLBURN LLP

(57) ABSTRACT

A heat exchanger includes parting sheets and a fin sheet interposed between the parting sheets and corrugated along a first axis to form fins. Each of the fins is segmented to define gaps, which are arranged along a second axis perpendicular to the first axis, and which cooperatively accommodate curvatures of the parting sheets and the fin sheet in a third axis perpendicular to the first and second axes.

18 Claims, 6 Drawing Sheets

(56) References Cited

U.S. PATENT DOCUMENTS

| | | | | |
|---|---|---|---|---|
| 5,894,882 A * | 4/1999 | Kikuchi | ............... | H01L 23/467 |
| | | | | 174/16.3 |
| 6,546,774 B2 * | 4/2003 | Granetzke | .............. | B21D 13/04 |
| | | | | 72/186 |
| 8,336,176 B2 * | 12/2012 | Hodgson | ............... | F01N 3/2821 |
| | | | | 29/6.1 |
| 10,100,740 B2 | 10/2018 | Thomas | | |
| 10,156,404 B2 | 12/2018 | Ueda | | |
| 2002/0153129 A1 | 10/2002 | White et al. | | |
| 2004/0013580 A1 * | 1/2004 | Bruck | ................... | F01N 3/0835 |
| | | | | 422/171 |
| 2015/0047820 A1 | 2/2015 | Rhoden | | |
| 2015/0260459 A1 * | 9/2015 | Cameron | ............... | F28F 3/022 |
| | | | | 29/890.03 |
| 2019/0086163 A1 * | 3/2019 | Pollard | ................... | F28D 7/005 |
| 2019/0212074 A1 * | 7/2019 | Lockwood | ................ | F28F 9/26 |
| 2020/0108474 A1 * | 4/2020 | Thresher | ................ | B23P 15/26 |
| 2023/0251040 A1 * | 8/2023 | Wiedenhoefer | ........... | F02C 7/18 |
| | | | | 165/152 |

FOREIGN PATENT DOCUMENTS

| | | | |
|---|---|---|---|
| EP | 3348800 A1 | | 7/2018 |
| JP | S6030628 Y2 | * | 9/1985 |
| JP | S6213993 A | | 1/1987 |
| KR | 100866389 B1 | * | 10/2008 |

\* cited by examiner

CONFORMAL HEAT EXCHANGER

BACKGROUND

The present disclosure relates to heat exchangers and, more particularly, to a conformal heat exchanger design formed by a method of creating curved, annular plates using folded fins.

Heat exchanger (HX) performance in a system is often limited based on the number of layers contained within the HX. For example, in annular passages of a turbine engine, a packed, non-conformal HX typically includes multiple parting sheets that are disposed to separate interleaved fin layers and has a rectangular cross-section that does not fit perfectly into the curvature of the annular passage. This limits the number of layers that can be included in the HX and thus limits HX performance.

In an HX with an annular conformal geometry, the annular conformal geometry allows additional layers to be fit into the HX as compared to a non-conformal HX. This fills the flow domain with active heat transfer elements instead of inert blockages. As such, for a given performance target, the annular conformal HX can achieve improved performance levels with potentially lighter weight and lower pressure drop characteristics than non-conformal HX designs. It is often the case, however, that a HX with an annular conformal geometry cannot be reliably manufactured.

Accordingly, a need exists for a production method that allows for the formation of a conformal or curved HX using conventional folded heat exchanger fin packs.

BRIEF DESCRIPTION

According to an aspect of the disclosure, a heat exchanger is provided and includes parting sheets and a fin sheet interposed between the parting sheets and corrugated along a first axis to form fins. Each of the fins is segmented to define gaps, which are arranged along a second axis perpendicular to the first axis, and which cooperatively accommodate curvatures of the parting sheets and the fin sheet in a third axis perpendicular to the first and second axes.

In accordance with additional or alternative embodiments, the fins are at least one of rectangular-shaped, V-shaped and sinusoidal.

In accordance with additional or alternative embodiments, the gaps open to accommodate positive curvatures of the parting sheets and the fin sheet in the third axis and the gaps close to accommodate negative curvatures of the parting sheets and the fin sheet in the third axis.

In accordance with additional or alternative embodiments, sidebars are disposed in connection with opposite ends of the fin sheet between the parting sheets and additional fin sheets are interposed between layers of parting sheets, the fin sheet interposed between the parting sheets and the corresponding sidebars.

In accordance with additional or alternative embodiments, additional fin sheets are corrugated along the second axis to form fins.

In accordance with additional or alternative embodiments, the fins of the additional fin sheets are segmented to accommodate additional curvatures of the layers.

In accordance with additional or alternative embodiments, the fins are braze bonded to the parting sheets.

In accordance with additional or alternative embodiments, braze bonds between base portions of the fins and a corresponding one of the parting sheets are substantially continuous and braze bonds between a connecting portion of the fins and a corresponding one of the parting sheets are segmented at each gap.

According to an aspect of the disclosure, a conformal heat exchanger for disposition within a curved passage is provided and includes multiple layers. Each of the multiple layers includes parting sheets and a fin sheet interposed between the parting sheets and corrugated along a first axis to form fins. Each of the fins includes base portions, sidewalls extending from edges of the base portions, respectively, and a connecting portion extending between edges of the sidewalls. The base portions and the connecting portion are bonded to corresponding ones of the parting sheets. The sidewalls and the connecting portion are segmented to define gaps, which are arranged along a second axis perpendicular to the first axis, and which cooperatively accommodate curvatures of the parting sheets and the fin sheet, which conform to a curvature of the curved passage, in a third axis perpendicular to the first and second axes.

In accordance with additional or alternative embodiments, the sidewalls extend from proximal edges of the base portions, respectively, and the connecting portion extends between distal edges of the sidewalls.

In accordance with additional or alternative embodiments, the gaps open to accommodate positive curvatures of the parting sheets and the fin sheet in the third axis and the gaps close to accommodate negative curvatures of the parting sheets and the fin sheet in the third axis.

In accordance with additional or alternative embodiments, each layer further includes sidebars disposed in connection with opposite ends of the fin sheet between the parting sheets and the conformal heat exchanger further includes additional fin sheets interposed between layers.

In accordance with additional or alternative embodiments, the additional fin sheets are corrugated along the second axis to form fins.

In accordance with additional or alternative embodiments, the fins of the additional fin sheets are segmented to accommodate additional curvatures of the layers.

In accordance with additional or alternative embodiments, the base portions and the connecting portion are braze bonded to the corresponding ones of the parting sheets.

In accordance with additional or alternative embodiments, braze bonds between the base portions and the corresponding one of the parting sheets are substantially continuous and braze bonds between the connecting portion and the corresponding one of the parting sheets are segmented at each gap.

According to an aspect of the disclosure, a method of assembling a conformal heat exchanger is provided and includes forming a fin sheet corrugated along a first axis to form fins extending along a second axis perpendicular to the first axis, segmenting the fins along the second axis, imparting a fin sheet curvature to the fin sheet in a third axis perpendicular to the first and second axes, interposing the fin sheet with the fin sheet curvature between parting sheets having parting sheet curvatures similar to the fin sheet curvature and bonding the fin sheet to each of the parting sheets.

In accordance with additional or alternative embodiments, the bonding includes braze bonding base portions of the fins to a corresponding one of the parting sheets and braze bonding connecting portions of the fins to a corresponding one of the parting sheets.

In accordance with additional or alternative embodiments, the fin sheet and the parting sheets form a layer of the conformal heat exchanger and the method further includes interleaving additional fin sheets between multiple layers to form an assembly and installing the assembly into a curved passage.

In accordance with additional or alternative embodiments, the method further includes segmenting fins of the additional fin sheets to accommodate additional curvatures of the layers.

Additional features and advantages are realized through the techniques of the present disclosure. Other embodiments and aspects of the disclosure are described in detail herein and are considered a part of the claimed technical concept. For a better understanding of the disclosure with the advantages and the features, refer to the description and to the drawings.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

A traditional plate-fin heat exchanger includes alternating layers of folded fin packs. Flexible in one direction, it can be rigid in the transverse or long direction. As a result, the traditional plate-fin heat exchanger is rectangular or cubical and does not package well in annular ducts of a turbine engine. An ability to 'curve' an otherwise rectangular heat exchanger around an annulus is thus desired to thereby provide for increased frontal area and increases heat load capacity.

Figure 1A:
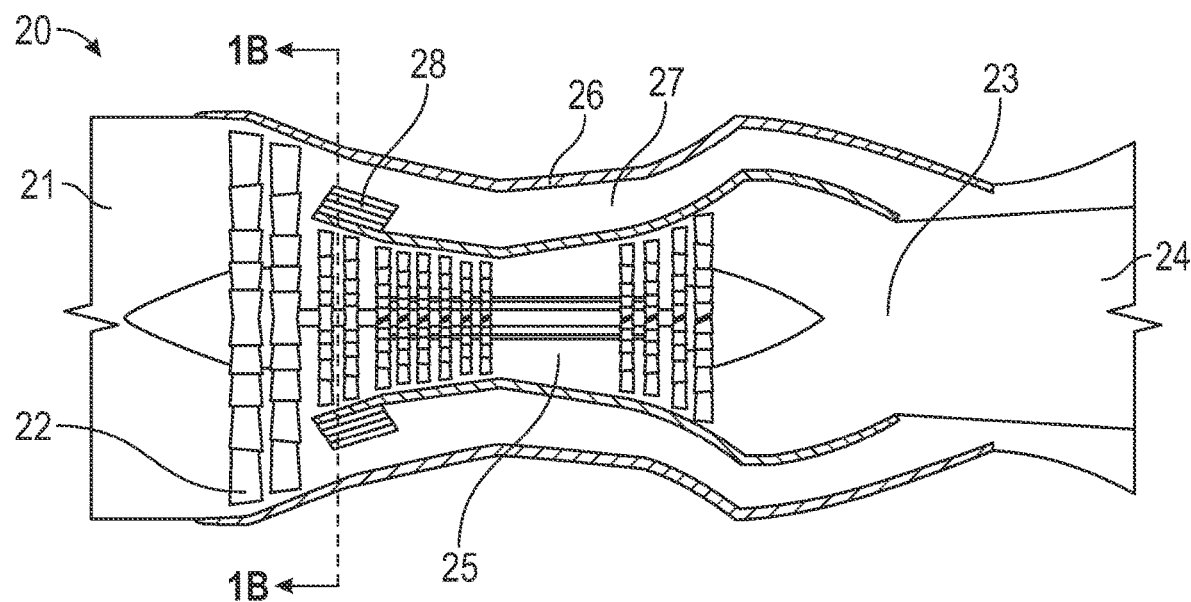
FIG. 1A is a side view of a gas turbine engine with a conformal heat exchanger in accordance with embodiments.
Figure 1B:
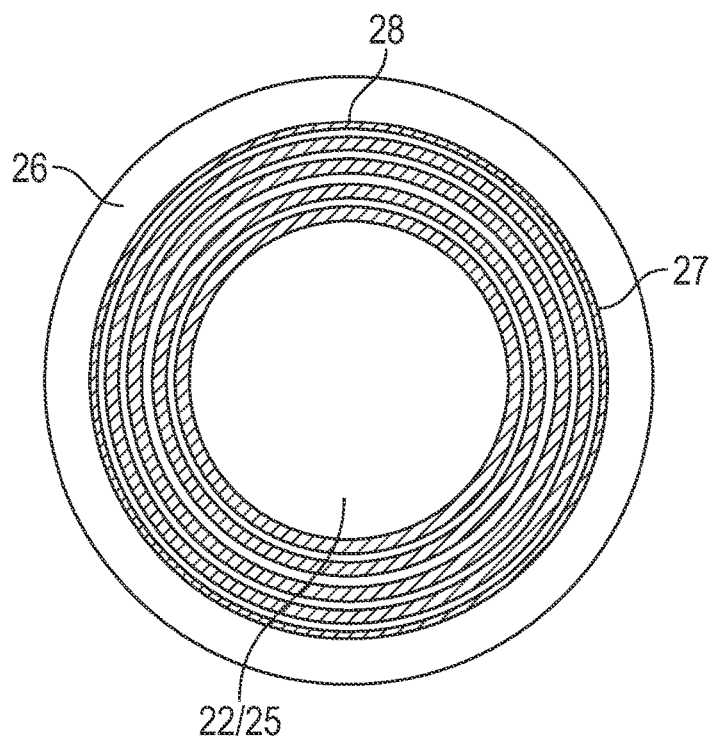
FIG. 1B is an axial view of the gas turbine engine of FIG. 1A taken along line 1B-1B of FIG. 1A in accordance with embodiments.

With reference to FIGS. 1A and 1B, a gas turbine engine 20 is provided and includes a fan section 21, a compressor section 22 aft of the fan section 21, a turbine section 23 aft of the compressor section 22 and a diffuser and/or afterburner section 24 aft of the turbine section 23. Inlet air enters the gas turbine engine 20 through the fan section 21 and is compressed in the compressor section 22. The compressed air is then mixed with fuel and combusted in a combustor 25 to produce high-temperature and high-pressure working fluid. The working fluid is then expanded in the turbine section 23 and optionally diffused or re-burned in the diffuser or afterburner section 24. The gas turbine engine 20 is at least partially encased in an outer wall 26, which surrounds at least the compressor section 22, to form a bypass duct 27. The bypass duct 27 is annular in shape. A heat exchanger 28 can be provided in the bypass duct 27. The gas turbine engine 20 can be provided as a turbofan engine or as any other similar type of engine.

As will be described below, a heat exchanger with a compound fin-plate structure is provided for use as the heat exchanger 28 of FIGS. 1A and 1B and can be formed by forming a fin sheet that is corrugated along a first axis to form fins extending along a second axis perpendicular to the first axis, segmenting the fins along the second axis, imparting a fin sheet curvature to the fin sheet in a third axis perpendicular to the first and second axes, interposing the fin sheet with the fin sheet curvature between parting sheets having parting sheet curvatures similar to the fin sheet curvature and bonding the fin sheet to each of the parting sheets. The fin sheet (along with sidebars) and the parting sheets form a layer of the conformal heat exchanger and additional fin sheets can be interleaved in multiple layers to form an assembly. This assembly can then be installed into a curved passage, such as the bypass duct 27 of the gas turbine engine 20 of FIGS. 1A and 1B, or another system using annular passages.

Figure 2:
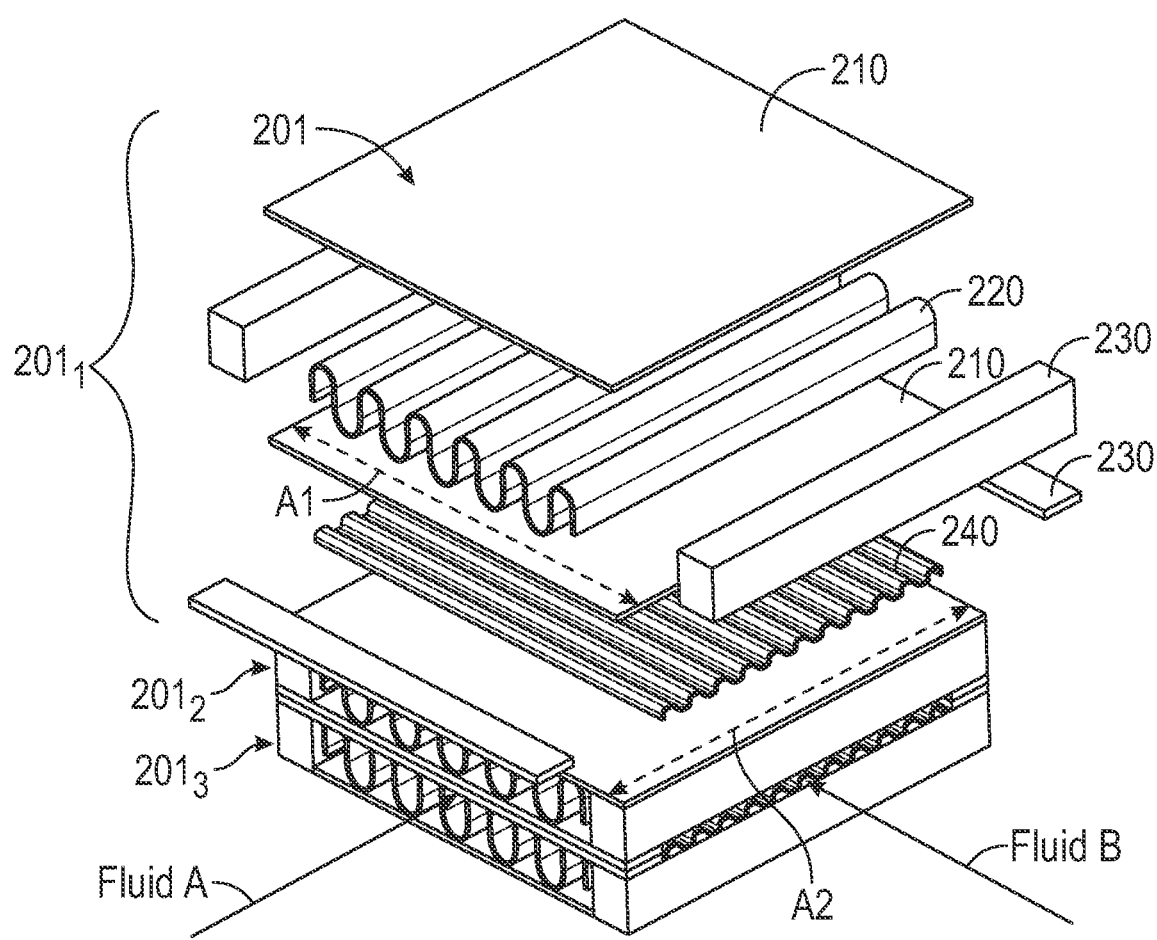
FIG. 2 is a partially exploded perspective view of a heat exchanger in accordance with embodiments.
Figure 3:
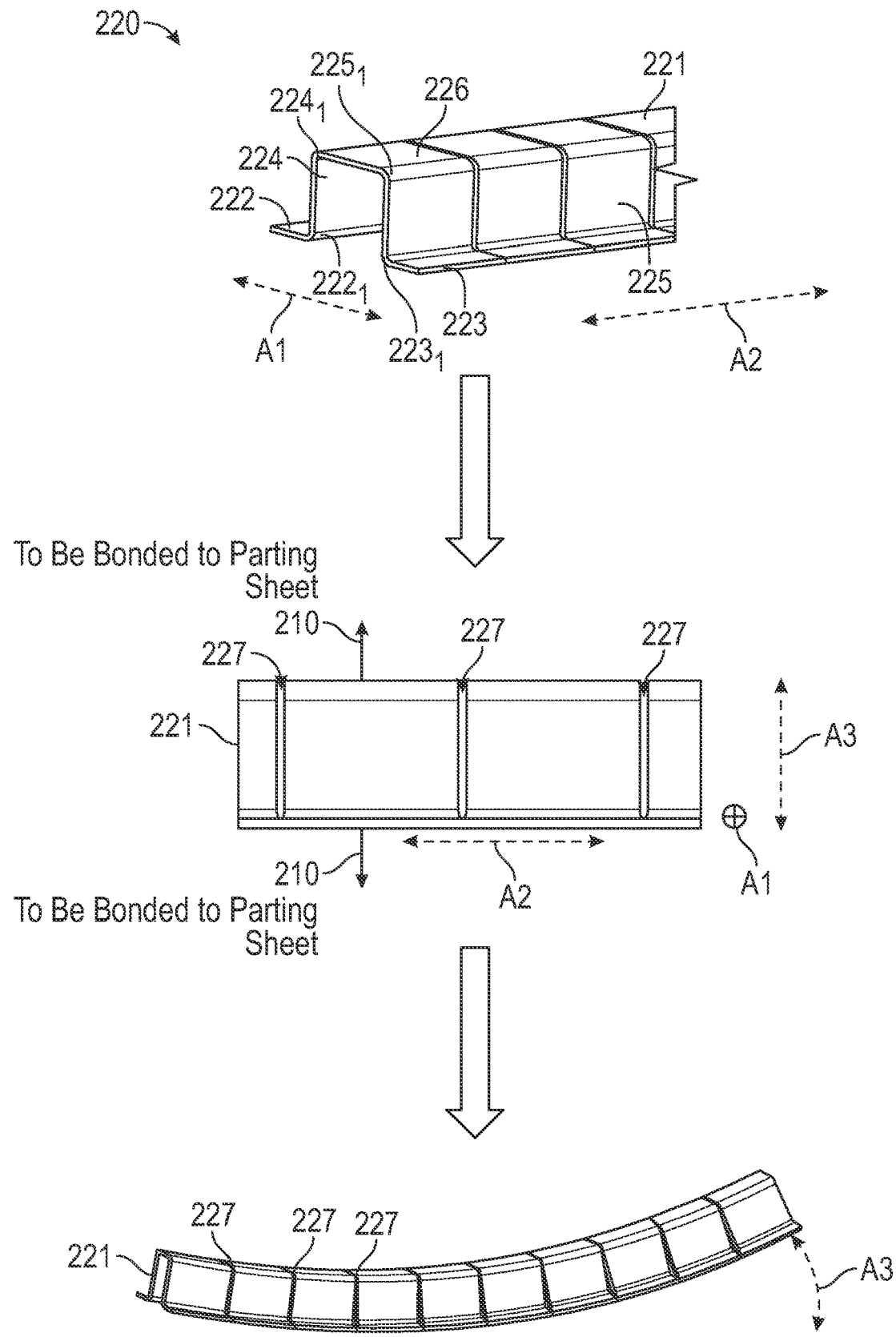
FIG. 3 is a perspective view of a fin of a fin sheet of FIG. 2 in various stages of machining in accordance with embodiments.
Figure 4:
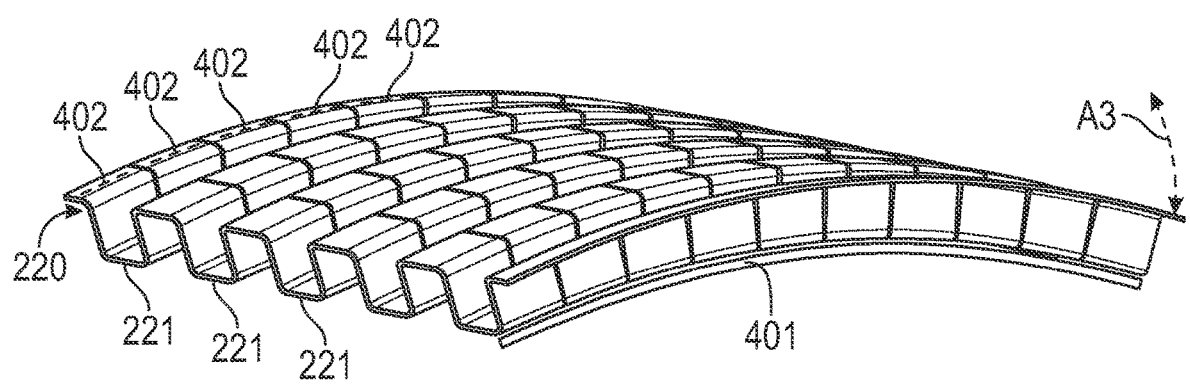
FIG. 4 is a perspective view of a fin sheet with multiple fins and with multiple cuts in each fin in accordance with embodiments.

With reference to FIGS. 2-4, a conformal heat exchanger 201 is provided for disposition within a curved passage of a heat exchanger system, such as the bypass duct 27 of the gas turbine engine 20 of FIGS. 1A and 1B. The conformal heat exchanger 201 can have multiple layers $201_1$, $201_2$, $201_3$ (only three layers are illustrated in FIG. 2 for clarity and brevity, though it is to be understood that additional layers can be added; the following description will relate to the illustrated case of there being three layers). Each of the multiple layers $201_1$, $201_2$, $201_3$ includes parting sheets 210 and a fin sheet 220, which is interposed between the parting sheets 210, as well as sidebars 230 disposed in connection with opposite ends of the fin sheet 220 and interposed between the parting sheets 210. The conformal heat exchanger 201 can further include additional fin sheets 240 interleaved between the multiple layers $201_1$, $201_2$, $201_3$. Each of the additional fin sheets 240 is interposed between corresponding parting sheets 210 of neighboring ones of the multiple layers $201_1$, $201_2$, $201_3$.

Fluid A can pass through the conformal heat exchanger 201 between and along the fins (to be described below) of the fin sheets 220 of each of the multiple layers $201_1$, $201_2$, $201_3$ in the direction of the fluid A arrow. Fluid B can pass through the conformal heat exchanger 201 between and along the fins (to be described below) of the additional fin sheets 240 in the direction of the fluid B arrow.

As shown in FIG. 3, the fin sheet 220 is corrugated along a first axis A1 to form fins 221 that extend along axis A2, which is perpendicular to axis A1. Each fin 221 includes first and second base portions 222, 223, first and second sidewalls 224, 225 extending from proximal edges $222_1$, $223_1$ of the first and second base portions 222, 223, respectively, and a connecting portion 226. The connecting portion 226 extends between distal edges $224_1$, $225_1$ of the first and second sidewalls 224, 225. The first and second base portions 222, 223 can each be contiguous with the corresponding one of the parting sheets 210 and the connecting portion 226 can be contiguous with to the other corresponding one of the parting sheets 210.

The first and second sidewalls 224, 225 and the connecting portion 226 of each fin 221 are segmented to define gaps 227. These gaps 227 can be, but are not required to be, parallel with one another and are arranged along the second axis A2. In this way, the gaps 227 cooperatively accommodate curvatures of the parting sheets 210 and the fin sheet 220 in a third axis A3. This third axis A3 is perpendicular to the first axis A1 and the second axis A2. In accordance with embodiments, the curvatures of the parting sheets 210 and the fin sheet 220 can conform to a curvature of the curved passage, such as the bypass duct 27 of the gas turbine engine 20 of FIGS. 1A and 1B. The gaps 227 terminate at the first and second base portions 222, 223 so as to preserve structural integrity of the fin sheet 220, although it is to be understood that the segmenting can extend to the proximal edges $222_1$, $223_1$ of the first and second base portions 222, 223, respectively, and beyond the proximal edge $222_1$, $223_1$ in some cases.

The gaps 227 will each converge or diverge depending on a bending direction of the corresponding fin sheet 220. In accordance with embodiments, the gaps 227 in the fins 221 can be formed by various processes including, but not limited to, electro-discharge machining (EDM), wire-EDM, water-jetting, etc.

In accordance with embodiments, the gaps 227 can be similar or unique in size and shape. In addition, although the gaps 227 are illustrated in FIG. 3 as having substantially uniform thicknesses through the connecting portion 226 and the first and second sidewalls 224, 225 of each fin 221, it is to be understood that other configurations are possible. For example, the gaps 227 can be tapered so as to be wider at the connecting portion 226 than at the proximal edges $222_1$, $223_1$ of the first and second base portions 222, 223, respectively. In this way, the tapered gaps 227 can accommodate increased curvature of the fin sheet 220 with perhaps fewer gaps 227 being formed.

Although the lowermost image in FIG. 3 is of the fin sheet 220 having a curvature in one direction, as noted above it is to be understood that the gaps 227 can open to accommodate positive curvatures of the parting sheets 210 and the fin sheet 220 in the third axis A3 (see FIG. 3) and that the gaps 227 can close to accommodate negative curvatures of the parting sheets 210 and the fin sheet 220 in the third axis A3 (see FIG. 4).

In accordance with embodiments, the first and second base portions 222, 223 and the connecting portion 226 can be braze bonded to the corresponding ones of the parting sheets 210, although it is to be understood that the bonds can be formed by other suitable processes, such as diffusion bonding processes. In any case, as shown in FIG. 4, the bonds (i.e., braze bonds) between the base portions 222, 223 and the corresponding one of the parting sheets 210 are substantially continuous bonds 401 and the bonds (i.e., braze bonds) between the connecting portion 226 and the corresponding one of the parting sheets 210 are segmented at each gap 227. That is, due to the presence of the gaps 227, the bonds between the connecting portion 226 and the corresponding one of the parting sheets 210 are discrete bonds 402.

Figure 5:
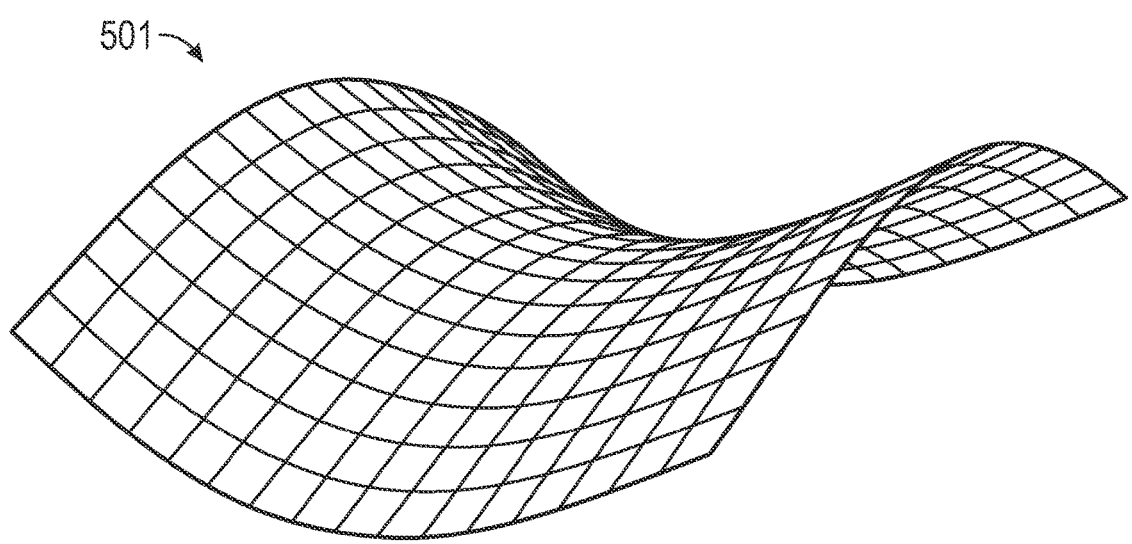
FIG. 5 is a graphical depiction of a saddle-shaped topology that a conformal heat exchanger can assume in accordance with embodiments.
Figure 6:
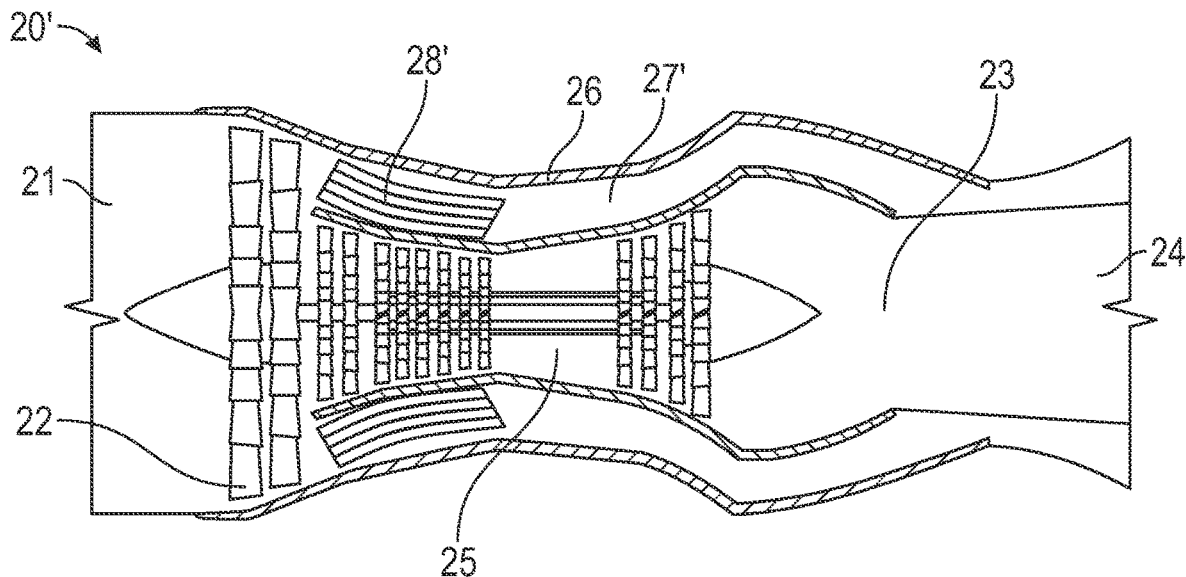
FIG. 6 is a side view of a gas turbine engine with a conformal heat exchanger having multiple axes of curvature in accordance with embodiments.

With reference back to FIG. 2 and with additional reference to FIGS. 5 and 6, the additional fin sheets 240 can be corrugated along the second axis A2 to form fins 241. These fins are similar to the fins 221 and need not be described in detail except to note that the height and pitch of the fins 221 and the fins 241 can be different from one another and can be different from layer-to-layer within the conformal heat exchanger 201.

In any case, the fins 241 of the additional fin sheets 240 can be segmented along the first axis A1 to accommodate additional curvatures of the multiple layers $201_1$, $201_2$, $201_3$ in the third axis A3. In these or other cases, the conformal heat exchanger 201 can have a saddle-shaped topography 501 (see FIG. 5) that can be fit as heat exchanger 28' into a curved passage with multi-axis curvatures, such as the bypass duct 27' of the gas turbine engine 20' of FIG. 6 (which is otherwise similar to the gas turbine engine 20 of FIGS. 1A and 1B). Although, the saddle-shaped topography 501 is illustrated in FIG. 5 as lacking a twisting component, it is to be understood that the segmenting of the fins 221 and the fins 241 accommodate formatting of a conformal heat exchanger 201 with a twisted saddle-shaped topography as well.

In accordance with embodiments, the segmenting of the fins 221 and the fins 241 can be executed by various processes including, but not limited to, electro-discharge machining (EDM), wire-EDM, water-jetting, etc.

Figure 7:
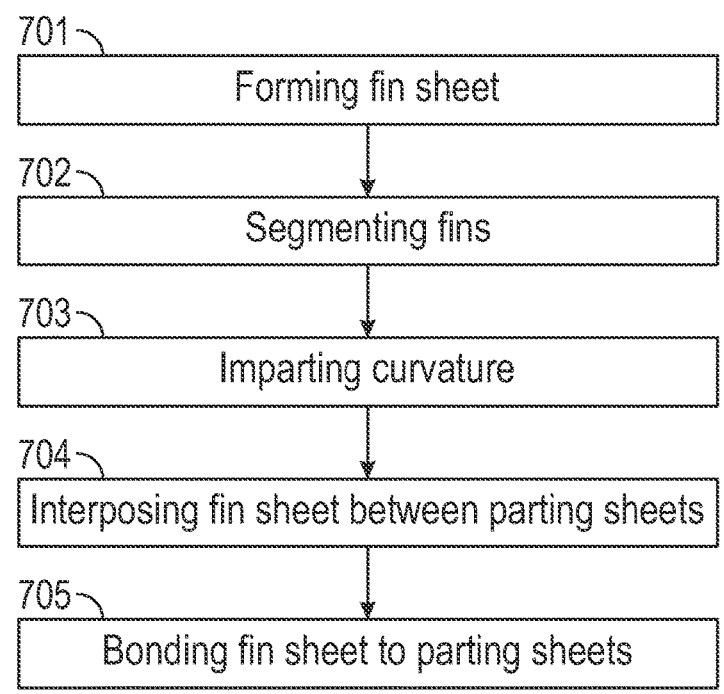
FIG. 7 is a flow diagram illustrating a method of assembling a conformal heat exchanger in accordance with embodiments.

With reference to FIG. 7, a method of assembling a conformal heat exchanger as described above is provided. The method includes forming a fin sheet corrugated along a first axis to form fins extending along a second axis perpendicular to the first axis (block 701), segmenting the fins along the second axis (block 702), imparting a fin sheet curvature to the fin sheet in a third axis perpendicular to the first and second axes (block 703), interposing the fin sheet with the fin sheet curvature between parting sheets having parting sheet curvatures similar to the fin sheet curvature (block 704) and bonding the fin sheet to each of the parting sheets (block 705).

The bonding of block 705 can include braze bonding of base portions of the fins to a corresponding one of the parting sheets and braze bonding of connecting portions of the fins to a corresponding one of the parting sheets, although it is to be understood that other suitable bonding processes can be used. Also, the fin sheet and the parting sheets form a layer of the conformal heat exchanger, and the method can further include interleaving additional fin sheets between multiple layers to form an assembly and installing the assembly into a curved passage. In these or other cases, the method can also include segmenting fins of the additional fin sheets to accommodate additional curvatures of the layers. The segmenting of block 702 and the segmenting of the fins of the additional fin sheet can be executed by various processes including, but not limited to, EDM, wire-EDM, water-jetting, etc.

Figure 8:
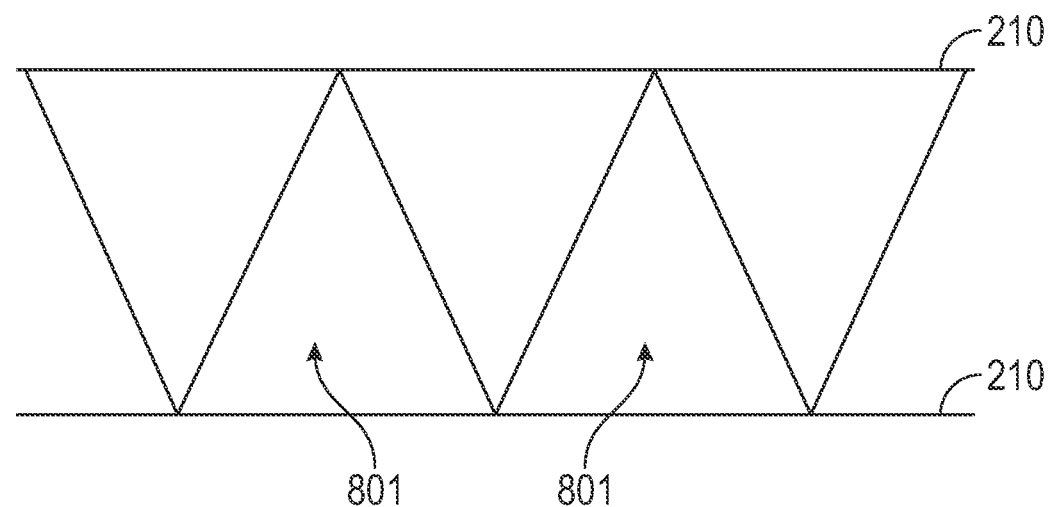
FIG. 8 is a cross-sectional view of V-shaped fins that can be segmented in accordance with embodiments.
Figure 9:
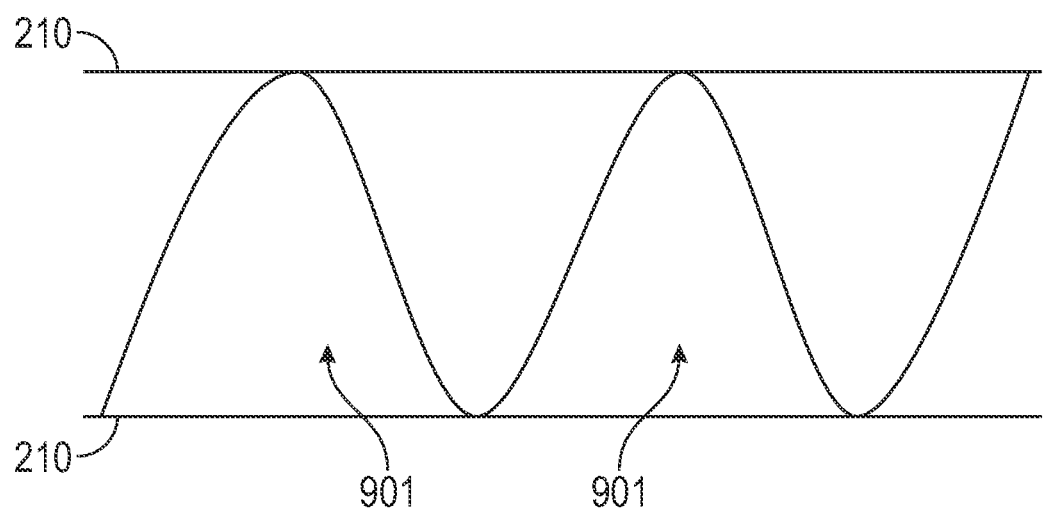
FIG. 9 is a cross-sectional view of sinusoidal fins that can be segmented in accordance with embodiments.

With reference to FIGS. 8 and 9, although the description provided herein generally relates to non-limiting embodiments in which the fin sheets 220 and the additional fin sheets 240 form rectangular fins 221 and 241, respectively, it is to be understood that this is not required and that other fin shapes are possible. These include, but are not limited to, fins with V-shaped or triangular cross-sections 801 (see FIG. 8) and fins with curved or sinusoidal cross-sections 901 (see FIG. 9). In each of these and other cases, the fins can be segmented along the second axis as described above to similar effect.

Technical effects and benefits of the present disclosure are that conventional machining equipment is used to modify a fin pack to make a slight modification. This slight modification allows flexibility to be imparted to the fin pack whereby the fin pack can be assembled around an annular form. The resulting structure is economical, durable, light weight and efficient.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the technical concepts in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

While the preferred embodiments to the disclosure have been described, it will be understood that those skilled in the art, both now and in the future, may make various improvements and enhancements which fall within the scope of the claims which follow. These claims should be construed to maintain the proper protection for the disclosure first described.

What is claimed is:

1. A heat exchanger, comprising:
   parting sheets; and
   a fin sheet interposed between the parting sheets and corrugated along a first axis to form fins,
   each of the fins being segmented to define gaps, which are arranged along a second axis perpendicular to the first axis, and which cooperatively accommodate curvatures of the parting sheets and the fin sheet in a third axis perpendicular to the first and second axes,
   wherein for each fin between neighboring gaps and in an uncurved state of the fin sheet:
   the fin sheet comprises first and second base portions, first and second sidewalls extending from proximal edges of the first and second base portions, respectively, and a connecting portion extending between distal edges of the first and second sidewalls,
   first and second groups of the neighboring gaps extend along the first and second sidewalls and the connecting portion and are equally wide at the connecting portion and the proximal edges of the first and second base portions and wider at the connecting portion than at the proximal edges of the first and second base portions, respectively, to be closable for accommodating negative curvatures of the parting sheets and the fin sheet in the third axis, and
   the second groups of the neighboring gaps are closable to a greater degree than the first groups of the neighboring gaps.

2. The heat exchanger according to claim 1, wherein the fins are at least one of rectangular-shaped, V-shaped and sinusoidal.

3. The heat exchanger according to claim 1, further comprising:
   sidebars disposed in connection with opposite ends of the fin sheet between the parting sheets; and
   additional fin sheets interposed between layers of parting sheets, the fin sheet interposed between the parting sheets and the corresponding sidebars.

4. The heat exchanger according to claim 3, wherein the additional fin sheets are corrugated along the second axis to form fins.

5. The heat exchanger according to claim 4, wherein the fins of the additional fin sheets are segmented to accommodate additional curvatures of the layers.

6. The heat exchanger according to claim 1, wherein the fins are braze bonded to the parting sheets.

7. The heat exchanger according to claim 6, wherein:
   braze bonds between base portions of the fins and a corresponding one of the parting sheets are continuous, and
   braze bonds between a connecting portion of the fins and a corresponding one of the parting sheets are segmented at each gap.

8. A conformal heat exchanger for disposition within a curved passage and comprising multiple layers each comprising:
   parting sheets; and
   a fin sheet interposed between the parting sheets and corrugated along a first axis to form fins, each of the fins comprising:
   base portions;
   sidewalls extending from edges of the base portions, respectively; and
   a connecting portion extending between edges of the sidewalls,
   the base portions and the connecting portion being bonded to corresponding ones of the parting sheets, and
   the sidewalls and the connecting portion being segmented to define gaps, which are arranged along a second axis perpendicular to the first axis, and which cooperatively accommodate curvatures of the parting sheets and the fin sheet, which conform to a curvature of the curved passage, in a third axis perpendicular to the first and second axes,
   wherein for each fin between neighboring gaps and in an uncurved state of the fin sheet:
   the fin sheet comprises first and second base portions, first and second sidewalls extending from proximal edges of the first and second base portions, respectively, and a connecting portion extending between distal edges of the first and second sidewalls,
   first and second groups of the neighboring gaps extend along the first and second sidewalls and the connecting portion and are equally wide at the connecting portion and the proximal edges of the first and second base portions and wider at the connecting portion than at the proximal edges of the first and second base portions, respectively, to be closable for accommodating negative curvatures of the parting sheets and the fin sheet in the third axis, and
   the second groups of the neighboring gaps are closable to a greater degree than the first groups of the neighboring gaps.

9. The conformal heat exchanger according to claim 8, wherein the sidewalls extend from proximal edges of the base portions, respectively, and the connecting portion extends between distal edges of the sidewalls.

10. The conformal heat exchanger according to claim 8, wherein:
    each layer further comprises sidebars disposed in connection with opposite ends of the fin sheet between the parting sheets; and
    the conformal heat exchanger further comprises additional fin sheets interposed between layers.

11. The conformal heat exchanger according to claim 10, wherein the additional fin sheets are corrugated along the second axis to form fins.

12. The conformal heat exchanger according to claim 11, wherein the fins of the additional fin sheets are segmented to accommodate additional curvatures of the layers.

13. The conformal heat exchanger according to claim 8, wherein the base portions and the connecting portion are braze bonded to the corresponding ones of the parting sheets.

14. The heat exchanger according to claim 13, wherein:
braze bonds between the base portions and the corresponding one of the parting sheets are continuous, and
braze bonds between the connecting portion and the corresponding one of the parting sheets are segmented at each gap.

15. A method of assembling a conformal heat exchanger, the method comprising:
forming a fin sheet corrugated along a first axis to form fins extending along a second axis perpendicular to the first axis;
segmenting the fins along the second axis;
imparting a fin sheet curvature to the fin sheet in a third axis perpendicular to the first and second axes;
interposing the fin sheet with the fin sheet curvature between parting sheets having parting sheet curvatures similar to the fin sheet curvature; and
bonding the fin sheet to each of the parting sheets,
wherein for each fin between neighboring gaps and in an uncurved state of the fin sheet:
the forming of the fin sheet is executed such that the fin sheet comprises first and second base portions, first and second sidewalls extending from proximal edges of the first and second base portions, respectively, and a connecting portion extending between distal edges of the first and second sidewalls,
the segmenting is executed such that first and second groups of the neighboring gaps extend along the first and second sidewalls and the connecting portion and are equally wide at the connecting portion and the proximal edges of the first and second base portions and wider at the connecting portion than at the proximal edges of the first and second base portions, respectively, to be closable for accommodating negative curvatures of the parting sheets and the fin sheet in the third axis, and
the second groups of the neighboring gaps are closable to a greater degree than the first groups of the neighboring gaps.

16. The method according to claim 15, wherein the bonding comprises braze bonding base portions of the fins to a corresponding one of the parting sheets and braze bonding connecting portions of the fins to a corresponding one of the parting sheets.

17. The method according to claim 15, wherein:
the fin sheet and the parting sheets form a layer of the conformal heat exchanger; and
the method further comprises interleaving additional fin sheets between multiple layers to form an assembly and installing the assembly into a curved passage.

18. The method according to claim 17, further comprising segmenting fins of the additional fin sheets to accommodate additional curvatures of the layers.

* * * * *